Patented July 5, 1949

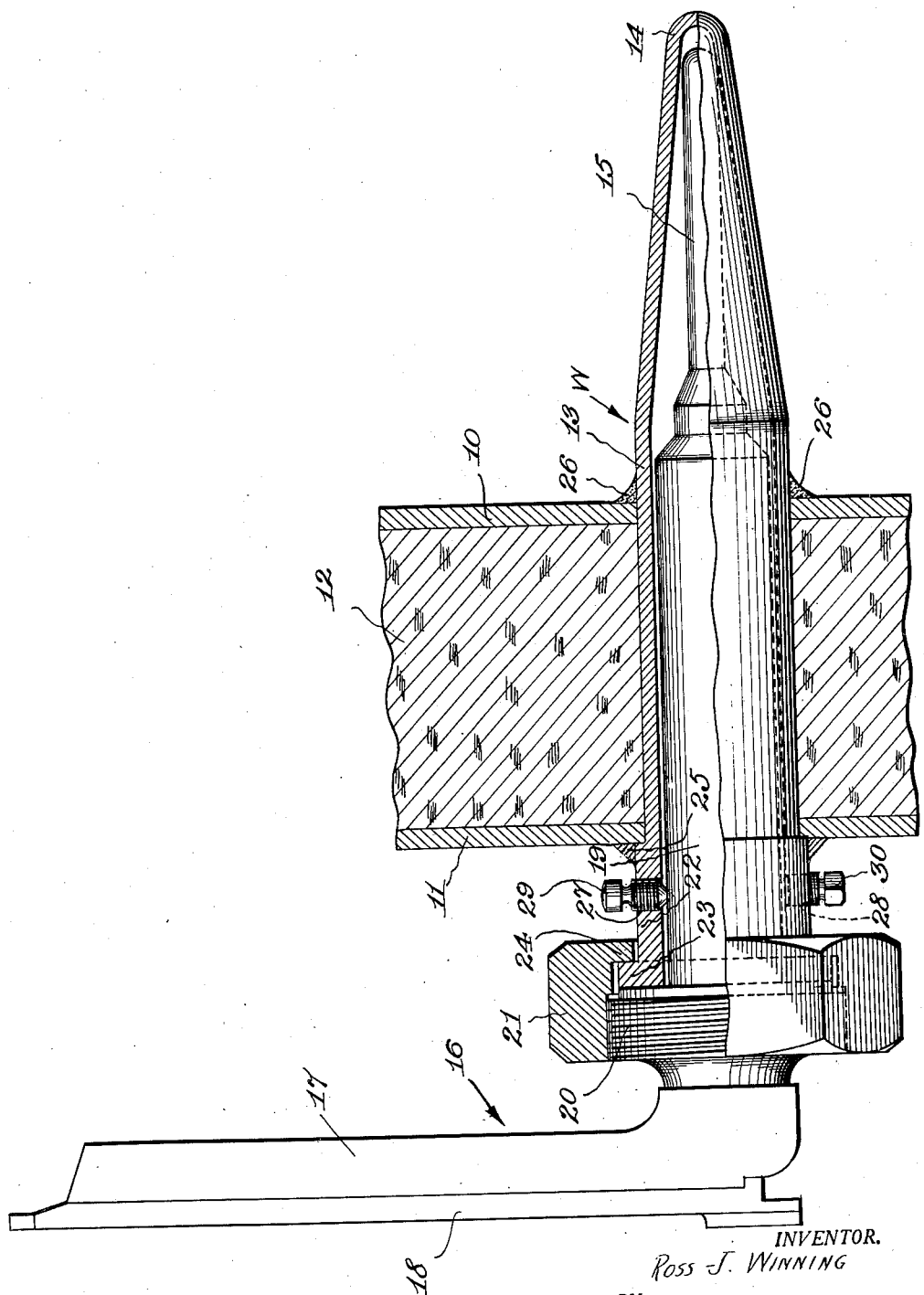

2,475,211

UNITED STATES PATENT OFFICE 2,475,211

THERMOMETER WITH MOUNTING WELL

Ross J. Winning, Franklin Square, N. Y., assignor to Sheffield Farms Company, Inc., New York, N. Y., a corporation of New York Application January 16, 1946, Serial No. 641,557

3 Claims. (Cl. 73—375)

This invention relates to devices for mounting or supporting thermometers in receptacles, and it relates particularly to a novel device for supporting indicating or recording thermometers in the walls of such devices as storage tanks, boilers, and the like wherein the temperature of a liquid or fluid therein is to be determined.

Milk storage tanks are typical of various forms of receptacles that must be maintained within a reasonably narrow range of temperature. Such milk storage tanks usually include an insulated wall for preventing temperature change of the mink during storage and processing. It is common to provide a hole through the wall of such tanks through which the bulb of a thermometer is inserted into contact with the milk in the tank. Usually, the thermometer is mounted in a packing gland in order the prevent leakage around the thermometer.

Inasmuch as milk is very susceptible to deterioration by bacterial activity, it is necessary to clean the tanks frequently, usually by scrubbing followed by treatment with steam, and under these conditions, it is necessary to remove the thermometer to prevent its breakage before cleaning. The thermometer is removed at least once a day and, because of the necessity of loosening the packing gland, with a wrench or other heavy tool, many thermometers are broken. Moreover, the packing gland is difficult to clean properly and, therefore, is a source of contamination of the milk.

It has been suggested heretofore that a permanent well or closed end tube can be mounted in the wall of the storage tank for receiving the bulb of the thermometer. This expedient is, however, not very satisfactory because of the low rate of heat exchange through the wall of the tube.

The present invention has as an object the provision of a novel type of thermometer well by means of which an improved rate of heat exchange is obtained.

Another object of the invention is to provide a liquid-filled thermometer well having improved heat exchanging properties which is so arranged that the liquid will be emptied before the thermometer can be detached.

Other objects of the invention will become apparent from the following description of a typical form of thermometer well and thermometer support embodying the present invention.

In accordance with the present invention, a tube having one closed end is inserted through the wall of the storage tank and is welded permanently thereto. This tube or well is adapted to receive the bulb of the thermometer and also a liquid which facilitates a more rapid and more uniform heat exchange between the wall of the well and the thermometer bulb within the well. In order to facilitate filling and emptying of the well, plugs are provided at the top and bottom of the well through which the liquid can be introduced and discharged.

The thermometer is secured to the outer end of the well and is held in position by a nut and the plugs. The plugs also prevent the nut from being completely released from the thermometer unless the plugs are first loosened or removed.

Thermometer wells and supports of the type described generally above, overcome the disadvantages of the prior types of thermometer supports and wells, inasmuch as more efficient heat exchange is obtained and the difficulties encountered in cleaning the tank are large overcome. Moreover, the number of thermometers that are broken is substantially reduced for the reason that the thermometer may be left in the well indefinitely. In addition, when it is desired to remove the thermometer, the workman removing the thermometer will be reminded that the heat conductive liquid in the well must be discharged before the thermometer can be removed, thereby assuring the proper cleaning of the well and avoiding the soiling of the outside of the tank and other equipment by inadvertent discharge of the liquid from the well.

For a better understanding of the present invention, reference may be had to the accompanying drawing in which the single figure is a view in side elevation and partially in section of a typical thermometer well embodying the present invention, with a portion of the side wall of a typical form of tank shown in vertical section.

The form of the invention chosen for purposes of illustration may be applied to a double wall tank having an inner wall 10, an outer wall 11 and a layer of insulation 12 between the walls, this structure being conventional in milk storage tanks and the like. It will be understood that the thermometer well construction described herein is adaptable to use in other types of tanks, boilers, and the like.

The thermometer well W may suitably consist of a tubular or hollow member 13 formed of stainless steel or the like and having a closed end 14 which, as illustrated, may be of tapered formation adapted to closely receive the bulb 15 of a thermometer 16.

The thermometer 16 may be of a type having a vertically disposed housing 17 provided with a scale plate 18 adjacent to the vertical tube of the thermometer, not shown. The inner end of the thermometer tube may be disposed at a right angle to the housing 17 and may be encased in a metal jacket 19 which terminates adjacent the bulb 15. Other types of thermometers, for example, mechanical or recording thermometers, or ordinary straight thermometers, may be used in the well W, if desired.

The metal jacket or sleeve 19 fits loosely within the well W and is provided with an enlarged collar 20 having external threads thereon for engagement with the internal threads of a nut 21 which is rotatably supported on an enlarged or thickened section 22 of the well tube 13. The thickened section 22 is provided with a flange 23 which cooperates with a flange 24 on the nut 21 to prevent its removal from the well W.

The well W may be secured in the walls 10 and 11 of the tank by means of suitable welds 25 and 26, the weld 26 preferably being of the filet type in order to provide a smooth rounded surface.

The thermometer can be secured to the end of the tube 13 by screwing the nut 21 on the collar 20, thereby fixing the thermometer firmly in position.

Inasmuch as the thermometer bulb 15 engages only a small area of the interior of the end 14 of the well W, or may be completely out of contact with it, the rate of heat exchange between the end 14 and the bulb 15 would normally be rather low. Accordingly, the tube 13 may be filled with a liquid such as, for example, alcohol, ethylene glycol, mercury, water, or the like to increase the rate of heat exchange. As gasket may be placed between the flange 23 and the collar 20 to prevent leakage, if necessary.

The top of the thickened portion 22 of the well is provided with a tapped hole 27 through which the heat exchange liquid may be introduced into the well W. In order to drain the well W, a similar tapped hole 28 is provided in the bottom of the thickened portion 22. Threaded plugs or set screws 29 and 30 are used to close the openings 27 and 28, respectively. They also engage the jacket 19 to anchor the thermometer in the well.

Inasmuch as it would be undesirable to permit the thermometer to be released from the well W without first emptying the well, the set screws 29 and/or 30 may be arranged in such closely spaced relationship to the flange 23 that the nut 21 cannot be completely released from the collar 20 without removal of the set screw 30 or both set screws 29 and 30. As illustrated, both set screws must be backed out to release the thermometer for removal from the well W even when the nut 21 is backed off to its full extent. The plugs 29 and 30, therefore, permit the well W to be filled and drained, and they act also as guard against the inadvertent discharge of liquid from the well, if an attempt should be made to remove the thermometer merely by backing off the nut 21.

It will be understood that the shape and size of the thermometer well may be varied, depending upon the type of thermometer used therein and that different types of receptacles and the like can be provided with such wells. Therefore, the form of the invention described herein is susceptible to considerable modification without departing from the invention and should be considered as illustrative only.

I claim:

1. A device for mounting a thermometer in a receptacle, comprising a hollow member having an open end for receiving the bulb of a thermometer, a closed end to be disposed in a receptacle and a drain opening adjacent to said open end, a member mounted rotatably and for axial movement on said hollow member adjacent to said open end for securing the thermometer to said hollow member in fluid-tight relationship, means for retaining said rotatable member on said hollow member, and a plug detachably mounted in and closing said opening, said plug being for engagement with the thermometer and restraining said rotatable member against axial movement sufficient to release said thermometer while said thermometer is engaged by said plug.

2. A device for mounting a thermometer in a receptacle, which comprises a hollow member having a closed end adapted to extend through a wall of a receptacle, an open end adapted to be disposed outside the receptacle and a drain opening adjacent to said open end for discharging a heat-conductive liquid from said hollow member, a threaded member mounted on said hollow member for rotation and axial movement relatively thereto, a flange adjacent the open end of said hollow member for retaining said threaded member on said hollow member, a thermometer having a sleeve received in said hollow member and having threads in engagement with said threaded member to secure said sleeve in said hollow member, a plug detachably mounted in said opening for closing the latter and engaging said sleeve to hold it in the hollow member, said plug being spaced from said flange an insufficient distance to permit release of said threaded member from said sleeve until said plug is released from engagement with said sleeve.

3. A device for mounting a thermometer in a receptacle, which comprises a hollow member having a closed end adapted to extend through a wall of a receptacle, an open end adapted to be disposed outside the receptacle and having openings in its top and bottom for introducing liquid into and draining liquid from the hollow member, a threaded member mounted on said hollow member for rotation and axial movement relatively thereto, a flange adjacent the open end of said hollow member for retaining said threaded member on said hollow member, a thermometer having a sleeve received in said hollow member and having threads in engagement with said threaded member to secure said sleeve in said tubular member, plugs detachably mounted in said openings for closing the latter and engaging said sleeve to retain the sleeve in said hollow member, said plugs being spaced from said flange a distance insufficient to permit release of said threaded member from said sleeve until said plugs are released from engagement with said sleeve.

ROSS J. WINNING.

REFERENCES CITED

The following references are of record in the file of this patent:

UNITED STATES PATENTS

| Number | Name | Date |
|---|---|---|
| 277,446 | Bonte | May 15, 1883 |
| 899,313 | Maurer | Sept. 22, 1908 |
| 900,575 | Neal | Oct. 6, 1908 |